(12) United States Patent
Zhao et al.

(10) Patent No.: US 12,705,702 B2
(45) Date of Patent: Aug. 11, 2026

(54) IMPROVING VISION PIPELINE ROBUSTNESS WITH METADATA

(71) Applicant: Sony Semiconductor Solutions Corporation, Kanagawa (JP)

(72) Inventors: Yupeng Zhao, Stuttgart (DE); Kensei Jo, Stuttgart (DE); Andreas Aumiller, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 131 days.

(21) Appl. No.: 18/849,552

(22) PCT Filed: Mar. 15, 2023

(86) PCT No.: PCT/EP2023/056604
§ 371 (c)(1),
(2) Date: Sep. 23, 2024

(87) PCT Pub. No.: WO2023/186544
PCT Pub. Date: Oct. 5, 2023

(65) Prior Publication Data

US 2025/0209572 A1 Jun. 26, 2025

(30) Foreign Application Priority Data

Mar. 31, 2022 (EP) .................................... 22166174

(51) Int. Cl.
*G06T 5/50* (2006.01)

(52) U.S. Cl.
CPC ...... *G06T 5/50* (2013.01); *G06T 2207/20221* (2013.01)

(58) Field of Classification Search
CPC ........................ G06T 5/50; G06T 2207/20221
See application file for complete search history.

(56) References Cited

U.S. PATENT DOCUMENTS

2016/0173869 A1* 6/2016 Wang .................. H04N 17/002 348/187
2017/0124693 A1* 5/2017 Ramalingam ............ G06T 7/70
2019/0096081 A1 3/2019 Gupta et al.
2019/0279379 A1* 9/2019 Srinivasan ................ G06T 7/50
2019/0356849 A1 11/2019 Sapienza et al.
2025/0209572 A1* 6/2025 Zhao ......................... G06T 5/50

OTHER PUBLICATIONS

International Search Report and Written Opinion mailed on Jun. 2, 2023, received for PCT Application PCT/EP2023/056604, filed on Mar. 15, 2023, 11 pages.

(Continued)

*Primary Examiner* — Amit Chatly
(74) *Attorney, Agent, or Firm* — XSENSUS LLP

(57) ABSTRACT

A system comprising circuitry configured to perform an image processing task, the circuitry comprising a multi-vision solution configured to provide APS data and EVS data, and the circuitry being configured to generate metadata and to provide the metadata to an image processing pipeline comprising an algorithm configured to perform the image processing task.

18 Claims, 14 Drawing Sheets

(56) References Cited

OTHER PUBLICATIONS

Brandli et al., "Real-Tme, High-Speed Video Decompression Using a Frame-and Event-Based DAVIS Sensor", 2014 IEEE International Symposium on Circuits and Systems (ISCAS), 2014, pp. 686-689.
"Event Camera", Wikipedia, Available Online at: https://en.wikipedia.org/wiki/Event_camera, Retrieved on: Dec. 23, 2021, pp. 1-8.
"Global Smartphone Market 2020-2027 by Operating System, Display Technology, Screen Size, RAM Capacity, Price Range, Distribution Channel, and Region: Trend Outlook and Growth Opportunity", Available Online at: https://www.researchandmarkets.com/reports/3072451/global-smartphone-market-2020-2027-by-operating?utm_source=GNOM&utm_medium=Press, Retrieved on: Dec. 23, 2021, pp. 1-5.
Gallego et al., "Event-based Vision: A Survey", arXiv: 1904.08405v3, Aug. 8, 2020, pp. 1-30.
"Understand and Apply Stereo Rectification forDepth Maps (Part 2)", Available Online at: https://www.andreasjakl.com/understand-and-apply-stereo-rectification-for-depth-maps-part-2/Understand and Apply Stereo Rectification for Depth Maps (Part 2)—andreasjakl.com.pdf, Dec. 2, 2020, pp. 1-19.
"Stereo Vision", 16-385 Computer Vision (Kris Kitani), Carnegie Mellon University, Available Online at: https://www.cs.cmu.edu/~16385/s17/Slides/13.1_Stereo_Rectification.pdf, 50 pages.
"Image rectification", Wikipedia, Available Online at: https://en.wikipedia.org/wiki/Image_rectification, Retrieved on: Mar. 25, 2022, pp. 1-7.
Lenero-Bardallo et al., "A Wide Linear Dynamic Range Image Sensor Based on Asynchronous Self-Reset and Tagging of Saturation Events", IEEE Journal of Solid-State Circuits, vol. 52, No. 6, Jun. 1, 2017, pp. 1-33.
Messikommer et al., "Multi-Bracket High Dynamic Range Imaging with Event Cameras", IEEE, 2022, 14 pages.
Shedligeri et al., "Photorealistic Image Reconstruction From Hybrid Intensity and Event Based Sensor", pseudoarXiv: 1805.06140v4 [cs.CV], Feb. 11, 2019, 6 pages.
"Manufacturing and Process Control: Sensors, Relays and Software Markets", MFG083A, BCC Publishing, Available Online at: https://www.bccresearch.com/market-research/manufacturing/sensors-relays-and-software-process-control-market.html, Jul. 2020, pp. 1-5.
"Sony to Release Two Types of Stacked Event-Based VisionSensors with the Industry's Smallest *1 4.86 μm Pixel Size forDetecting Subject Changes Only Delivering High-Speed, High-Precision Data Acquisition to Improve Industrial Equipment Productivity", Sony Semiconductor Solutions Corporation, Available Online at: https://www.sony-semicon.co.jp/e/news/2021/2021090901.html, Sep. 9, 2021, pp. 1-11.
"Technology : EVS | Image Sensor : Industry | Products | Sony Semiconductor Solutions Group", Sony Semiconductor Solutions Group, Available Online at: https://www.sony-semicon.co.jp/e/products/IS/industry/technology/evs.html, Retrieved on: Dec. 23, 2021, pp. 1-23.

* cited by examiner

EVS pixel

APS pixel

R – Red color APS pixel,
G – Green color APS pixel,
B – Blue color APS pixel,
E – event pixel

Layout 1

| R | G | R | G |
|---|---|---|---|
| E | B | E | B |
| R | G | R | G |
| E | B | E | B |

Layout 2

| R | R | G | G | R | E | G | G |
|---|---|---|---|---|---|---|---|
| E | E | G | G | R | E | G | G |
| G | G | E | E | G | G | E | B |
| G | G | B | B | G | G | E | B |
| R | E | G | G | R | R | G | G |
| R | E | G | G | E | E | G | G |
| G | G | E | B | G | G | E | E |
| G | G | E | B | G | G | B | B |

Layout 3

| R | E | G | G | R | E | G | G |
|---|---|---|---|---|---|---|---|
| R | E | G | G | R | E | G | G |
| G | G | E | B | G | G | E | B |
| G | G | E | B | G | G | E | B |
| R | E | G | G | R | E | G | G |
| R | E | G | G | R | E | G | G |
| G | G | E | B | G | G | E | B |
| G | G | E | B | G | G | E | B |

IMPROVING VISION PIPELINE ROBUSTNESS WITH METADATA

CROSS-REFERENCE TO RELATED APPLICATIONS

The present application is based on PCT filing PCT/EP2023/056604, filed Mar. 15, 2023, which claims priority from European Patent Application No. 22166174.7, filed Mar. 31, 2022, the entire contents of each are incorporated herein by reference.

TECHNICAL FIELD

The present disclosure generally pertains to the field of computer vision, in particular to improving vision pipeline robustness.

TECHNICAL BACKGROUND

Computer vision deals with how computers can gain high-level understanding from digital images or videos. From the perspective of engineering, it seeks to understand and automate tasks that the human visual system can do.

With the ever more sophisticated and diversified needs of the industrial equipment business, the use of sensing to extract the necessary information from images captured by cameras continues to grow, demanding ever more efficient data acquisition.

There is thus a need to enhance the image processing pipeline of computer vision systems and methods.

SUMMARY

According to a first aspect, the disclosure provides a system comprising circuitry configured to perform an image processing task, the circuitry comprising a multi-vision solution configured to provide APS data and EVS data, and the circuitry being configured to generate metadata and to provide the metadata to an image processing pipeline comprising an algorithm configured to perform the image processing task.

According to a second aspect, the disclosure provides a method for performing an image processing task, comprising obtaining APS data and EVS data from a multi-vision solution, generating metadata, and providing the metadata to an image processing pipeline comprising an algorithm configured to perform the image processing task.

According to a third aspect, the disclosure provides a program comprising instructions, the instructions being configured to, when operated by a processor, perform the above method.

Further aspects are set forth in the dependent claims, the following description and the drawings.

BRIEF DESCRIPTION OF THE DRAWINGS

Embodiments are explained by way of example with respect to the accompanying drawings, in which:

FIG. 3 shows three example of possible RGB-Event hybrid sensor layouts;

FIG. 13 shows an example of metadata which comprises white balance values for the pixels of a frame;

DETAILED DESCRIPTION OF EMBODIMENTS

Figure 1:
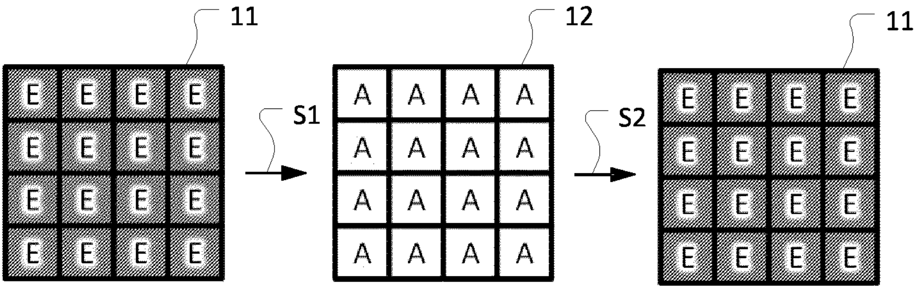
FIG. 1 provides a schematic representation of a hybrid sensor which relies on temporal multiplexing.

Before a detailed description of the embodiments under reference of FIG. 1 to FIG. 12, general explanations are made.

The embodiments provide a system comprising circuitry configured to perform an image processing task, the circuitry comprising a multi-vision solution configured to provide APS data and EVS data, and the circuitry being configured to generate metadata and to provide the metadata to an image processing pipeline comprising an algorithm configured to perform the image processing task.

An image processing task may be any activity or work which is performed on image data. In particular, an image processing task may comprise producing an output image based on input image data.

APS data (where APS stands for "Active Pixel Sensor") may be obtained from a conventional, non-event-based image sensor technology comprising e.g. RGB pixels, gray level pixels, or the like. APS technology may for example comprise CMOS or CCD image sensor technology.

EVS data may be obtained according to any event-based vision techniques, such as from pixels of an event-based vision sensors.

The metadata may be any data that provides information about other data, for example information about image data provided by a hybrid sensor.

Circuitry may include a processor. The processor may for example be a processor specialized for a specific task such as a tensor processing unit, an image signal processor, or a Field Programmable Gate Array (FPGA), but it is not limited to these types of processors. Data processing may for example be performed by processing unit which is incorporated in an existing processing pipeline of an image processing pipeline. The circuitry or processor may also be configured to implement a neural network, such as a CNN or DNN, or the like.

Circuitry may include a memory, a storage, input means, output means, a light emitting diode, loudspeakers, an interface, etc., as it is generally known for electronic devices. Moreover, it may include sensors for sensing still image or video image data, sensors for sensing a fingerprint, sensors for sensing environmental parameters, etc.

The image processing pipeline may be configured to use the metadata to counteract changes in an image-event data stream relationship.

The algorithm may for example be optimized to a certain image-event output relationship.

The metadata may for example comprise APS metadata obtained from the multi-vision solution, EVS metadata obtained from the multi-vision solution, camera metadata, and/or extra metadata from additional sensors.

The circuitry may for example be configured to provide the metadata to a pre-processing of the image processing pipeline.

The processing pipeline may for example comprise an event pre-processing, and wherein the event pre-processing is configured to use the metadata to pre-process the EVS data or to pre-process data derived from the EVS data.

The circuitry may be configured to provide the metadata to a post-processing of the image processing pipeline.

The circuitry may be configured to provide the metadata to a blending, the blending being configured to blend APS data or data derived from the APS data with EVS data or data derived from the EVS data based on the metadata.

The circuitry may be configured to provide the metadata directly to the algorithm of the image processing pipeline.

According to some embodiments, the metadata comprises information on event pixel location.

According to some embodiments, the metadata comprises a saturated area mask.

The hybrid sensor may for example comprise circuitry configured to generate the saturated area mask.

The image processing pipeline may for example be configured to generate the saturated area mask.

The image processing pipeline may for example comprise an event transformation.

Performing the image processing task may comprise generating a target image.

Performing the image processing task may comprise generating a target image and performing a post-processing.

The metadata may for example comprise of one or more of a white balance value, a tone reproduction gain, a gamma gain, an APS pixel noise sigma, an APS pixel gain, an APS exposure timestamps, an EVS contrast threshold value, IMU data, camera calibration data, sensor temperature, or an intermediate image from inside the image processing pipeline.

In some embodiments, the multi-vision solution comprises an EVS sensor and an APS sensor. The EVS sensor and the APS sensor may for example be located on different chips within a single camera device, or the EVS sensor and the APS sensor may located on a single chip. Still further, the hybrid sensor may comprise an APS sensor and an EVS sensor located within a common pixel array thus forming a hybrid pixel array.

In other embodiments, the multi-vision solution comprises a multi-camera system. That is the hybrid sensor may comprise an EVS sensor located in a first camera and an APS sensor located in a second camera, different from the first camera.

The embodiments also provide a method for performing an image processing task, comprising obtaining APS data and EVS data from a multi-vision solution, generating metadata, and providing the metadata to an image processing pipeline comprising an algorithm configured to perform the image processing task.

The embodiments also provide a program comprising instructions, the instructions being configured to, when operated by a processor, perform the methods described herein.

Event-Based Vision Sensors (EVS)

Conventional cameras such as those found in smartphones function by regularly acquiring, at a specific frame rate, full images of the whole scene, which is done by exposing the pixels of the image all at the same time. With this technique, however, a moving object cannot be detected until all the pixels have been analyzed by the on-board computer. With the frame-based method used by conventional cameras, the entire image is output at certain intervals determined by the frame rate. Conventional cameras have low frames rates and need good light conditions. Visual systems using conventional cameras or depth sensors are accurate (up to 5 cm), but are not fast.

With conventional cameras, the faster the sensor or the object is being moved, the lower the SNR (signal-to-noise ratio) in the image acquired. Movement during the exposure period leads to motion blur, obfuscating e.g. the tag to be detected and recognized.

In the embodiments described below in more detail, the conventional image sensor as explained above is called "APS" (Active Pixel Sensor).

Event-based Vision Sensors (hereafter also referred to as EVS sensors or simply EVS, or also as event camera), to the contrary, utilize an event-based method that asynchronously detects pixel luminance changes and outputs data with pixel position and time information, thereby enabling high-speed, low latency data output. That is, EVS sensors register changes in contrast with very high temporal resolution. EVS sensors have low latency (in the order of microseconds), and high dynamic range. They provide a much higher "framerate" than traditional vision systems. They thus are more robust to motion blur in adverse lighting scenarios. An event-based vision sensor (EVS) thus can sense higher speed objects, higher dynamic range scenes, using less data compared to conventional image sensors. Modern event cameras have microsecond temporal resolution, 120 dB dynamic range, and less under/overexposure and motion blur than frame cameras.

EVS sensors respond to brightness changes in the scene asynchronously and independently for every pixel. Pixels that detect no brightness change remain silent. When the brightness change of a pixel exceeds a threshold, the camera sends an event, which is transmitted from the chip with the location, the time, and the polarity of the change. The events are transmitted from the pixel array out of the camera using a shared digital output bus, typically by using address-event representation (AER) readout.

As an EVS sensor records changes in intensity (temporal contrast steps), little movement yields a rather low SNR, as information is difficult to disentangle from background noise. The faster the object or camera moves, the higher the SNR, until other limits (e.g. bandwidth limitations).

Additionally, the SNR of the EVS is also dependent on the underlying texture of the area of interest. Flat (white) areas generate almost no events, irrespective of movement while contrast-rich areas generate a lot of events. Hence, the EVS is well suited for item tag registration tasks.

The output of an EVS is a variable data stream of digital events, with each event representing a change of brightness of predefined magnitude at a pixel at a particular time. In contrast to conventional cameras, EVS sensors generate a sparse stream of events so that only a tiny fraction of all pixels in the image needs to be processed by the on-board computer, thus speeding up the computations considerably. The faster the motion, the more events per second are generated. Typically, events are timestamped with microsecond resolution and are transmitted with sub-millisecond latency.

Multi-Vision Solution

The following embodiments describe multi-vision solutions providing active pixel sensor data (APS) and Event-based sensor data (EVS). Such a multi-vision solution may for example be realized as a hybrid sensor as described. The hybrid vision sensor may for example comprise an EVS sensor and an APS sensor. A multi-vision solution may also be multi sensor solution. The EVS sensor and the APS sensor of the hybrid vision sensor may for example be located on different chips within a single camera device, or the EVS sensor and the APS sensor of the hybrid vision sensor may be located on a single chip. Still further, a multi-vision solution may also be a hybrid sensor as shown in below with reference to FIG. 5 described below in more detail, comprising an APS sensor and an EVS sensor located within a joint pixel array thus forming a hybrid pixel array. In other embodiments, the multi-vision solution comprises a multi-camera system as described with regard to FIG. 14 below. A multi-camera system may for example comprise an EVS sensor located in a first camera and an APS sensor located in a second camera, different from the first camera.

Hybrid Sensors

There are several types of sensors which can capture both intensity and event in a single sensor. In the following, these types of sensors are called hybrid sensors.

DAVIS (Dynamic and Active-pixel Vision Sensor) is an example of a hybrid sensor that works as both, active pixel sensor (APS) and Event-based sensor (EVS) with a shared circuit, such that all pixels can capture intensity and events simultaneously.

Other techniques rely on temporal multiplexing. In this case, sensors have pixels which can change the operation mode and capture events and intensity alternatively.

FIG. 1 provides a schematic representation of a hybrid sensor which relies on temporal multiplexing. Pixels of the hybrid sensor operate either as EVS pixel, or, alternatively, as APS pixels (indicated as by pixels E, or, respectively, A in FIG. 1). In a first state 11, all pixels of a hybrid sensor operate as EVS pixels. After a first switch of the operation mode as indicated by arrow S1, the hybrid sensor operates in a second state 12. In this second state 12, all pixels of the hybrid sensor operate as APS pixels. After a second switch of the operation mode as indicated by arrow S2, the hybrid sensor reverts to the first state 11 in which all pixels of the hybrid sensor again operate as EVS pixels.

Yet other techniques rely on spatial multiplexing. In this case, sensors have both EVS and APS pixels, such that it can capture both kinds of information simultaneously.

Figure 2:
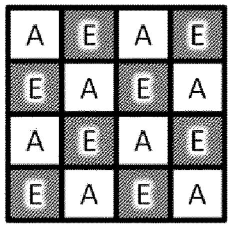
FIG. 2 provides a schematic representation of a hybrid sensor which relies on spatial multiplexing.

FIG. 2 provides a schematic representation of a hybrid sensor which relies on spatial multiplexing. Pixels of the hybrid sensor are either of the EVS pixel type, or of the APS pixel type (indicated as by pixels E, or, respectively, A in FIG. 1). Pixels of the EVS pixel type and pixels of the APS pixel type are arranged in a pixel array according to a pattern. In the example of FIG. 2, pixels of the EVS pixel type and pixels of the APS pixel type alternate in a row, and also in a column of the pixel array. In a first pixel row of the pixel array, pixels alternate according to the pattern A, E, A, E. In a second pixel row, pixels alternate according to the pattern E, A, E, A. In a third pixel row of the pixel array, pixels alternate according to the pattern A, E, A, E. In a fourth pixel row, pixels of the EVS pixel type and pixels of the APS pixel type alternate according to the pattern E, A, E, A.

RGB-Event hybrid sensors typically have a color filter on each APS pixel such that it captures a color image, and event pixels capture events. Both types of the pixels can work at the same time FIG. 3 shows three example of possible RGB-Event hybrid sensor layouts. In FIG. 3, R denotes APS pixels of red color, G denotes APS pixels of green color, B denotes APS pixels of blue color, and E denotes event pixels. Event pixels are indicated by the dashed squares, whereas APS pixels are indicated by blank squares. A pixel matrix of a hybrid sensor may repeat the layouts in both dimensions of the sensor.

According to a first exemplifying layout ("Layout 1"), the layout comprises a matrix of 4×4 pixels and the layout is generated by repeating a sub-pattern of 2×2 pixels twice in the vertical direction and in the horizontal direction, each sub-pattern of 2×2 pixels comprising three APS pixels R, G, B and one EVS pixel E.

According to a second exemplifying layout ("Layout 2"), the layout comprises a matrix of 8×8 pixels and is generated by repeating two 4×1 sub-patterns, namely R, R, G, G, and, G, G, B, B, and occasionally replacing APS pixels in these sub-patterns by EVS pixels. According to this second layout, a first column of a pixel layout comprises pixels that are arranged according to the pattern R, R, G, G, R, E, G, G. A second column of the pixel layout comprises pixels that are arranged according to the pattern E, E, G, G, R, E, G, G. A third column of the pixel layout comprises pixels that are arranged according to the pattern G, G, E, E, G, G, E, B. A fourth column of the pixel layout comprises pixels that are arranged according to the pattern G, G, B, B, G, G, E, B. A fifth column of the pixel layout comprises pixels that are arranged according to the pattern R, E, G, G, R, R, G, G. A sixth column of the pixel layout comprises pixels that are arranged according to the pattern R, E, G, G, E, E, G, G. A seventh column of the pixel layout comprises pixels that are arranged according to the pattern G, G, E, B, G, G, E, E. An eight column of the pixel layout comprises pixels that are arranged according to the pattern G, G, E, B, G, G, B, B.

According to a third exemplifying layout ("Layout 3"), the layout comprises a matrix of 8×8 pixels and the layout is generated by repeating two 4×1 sub-patterns. According to this third layout, a first and second column, as well as a fifth and sixth column of a pixel layout comprise pixels that are arranged according to the pattern R, E, G, G, R, E, G, G, that is, the pattern R, E, G, G is repeated twice in a row. A third and fourth column, as well as a seventh and eights column of the pixel layout comprise pixels that are arranged according to the pattern G, G, E, B, G, G, E, B, that is, the pattern G, G, E, B is repeated twice in a row.

The above layouts of hybrid sensors may allow for different exposure times among the modalities, e.g. using a fixed frequency for RGB frames while reading out events asynchronously.

In some operation modes, binning may be applied. That is, some pixels are read out together and output as single pixel.

Multi-Camera System

The proposed methods can also be utilized for multi camera system, for example in a system comprising a stereo camera system of the APS-type, and EVS cameras.

Figure 14:
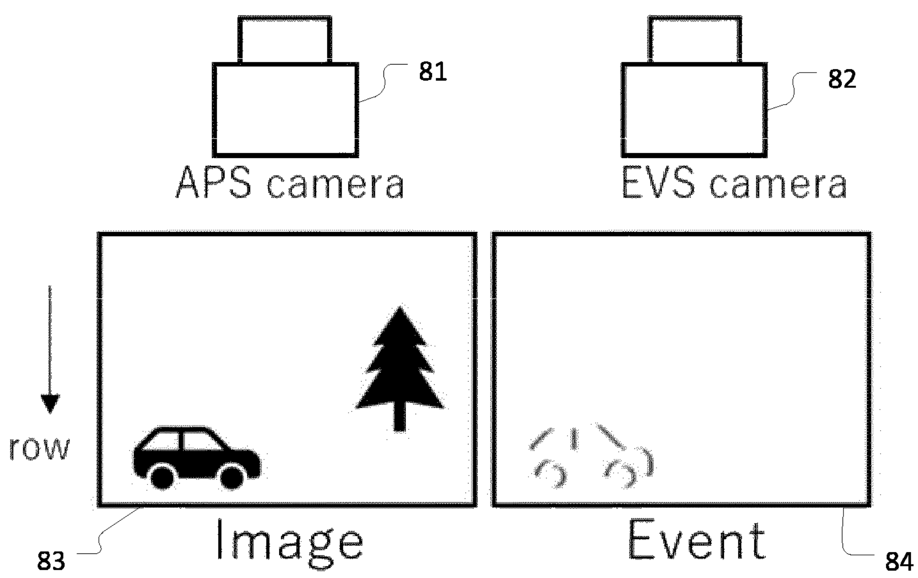
FIG. 14 shows an example of a multi camera system.

FIG. 14 shows an example of a multi camera system. The multi camera system comprises a camera 81 of the APS-type and an EVS camera 82. The camera 81 of the APS type provides an image 83 of a scene. EVS camera 82 provides event data 84 from the same scene.

Figure 15:
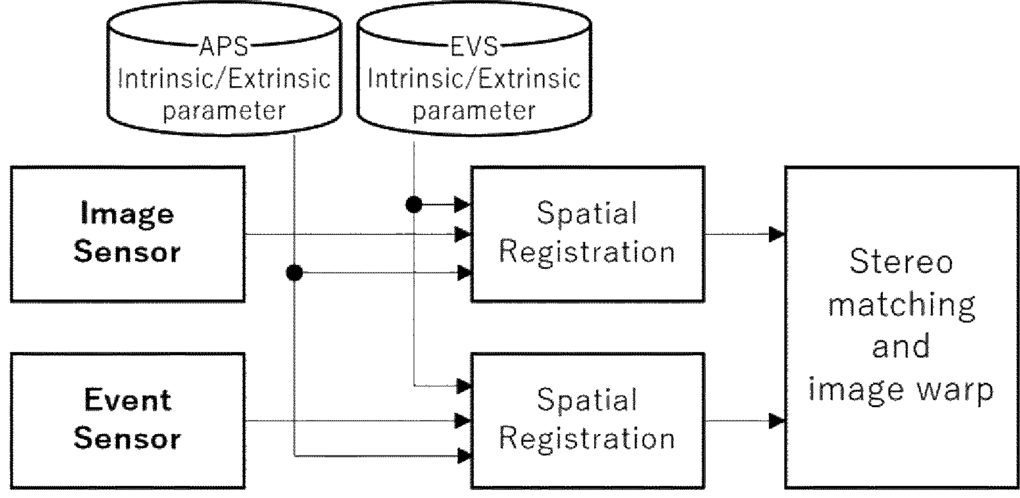
FIG. 15 shows an example of spatial registration of data from an image sensor and event data from an event sensor to achieve stereo matching and image warping.

When multiple cameras are used, it is advantageous to correct the difference of camera location. This is known to the skilled person from stereo-vision. For example, both camera data are rectified as normal stereo vision, using intrinsic and extrinsic parameters (such as location information, orientation of the camera, etc.) as shown in FIG. 15. As a result of this process, objects are projected at the same horizontal location in each (image and event) plane. This process makes the matching process easy. Stereo Rectification is for example described by Kris Kitani in Stereo Vision, 16-385, Computer Vision, Carnegie Mellon University (https://www.cs.cmu.edu/~16385/s17/Slides/13.1_Stereo_Rectification.pdf), in "Understand and Apply Stereo Rectification for Depth Maps" (https://www.andreasjakl.com/understand-and-apply-stereo-rectification-for-depth-maps-part-2/), or in the article "Image rectification" (https://en.wikipedia.org/wiki/Image_rectification).

Then, stereo matching and image warping is applied which comprises finding the same object (matching) in each plane. The position of an object on the image depends on the depth of the object. However, as the result of Spatial Registration, an object is projected to the same row in both images, therefore it is enough to search the object horizontal line. After, finding the corresponding location in each plane, the two data (image and events) are warped such that both data are placed same image location. In this way, data from multiple cameras with different position can be processed in a subsequent processing pipeline.

Data Processing in a Multi-Vision Solution

Figure 4:
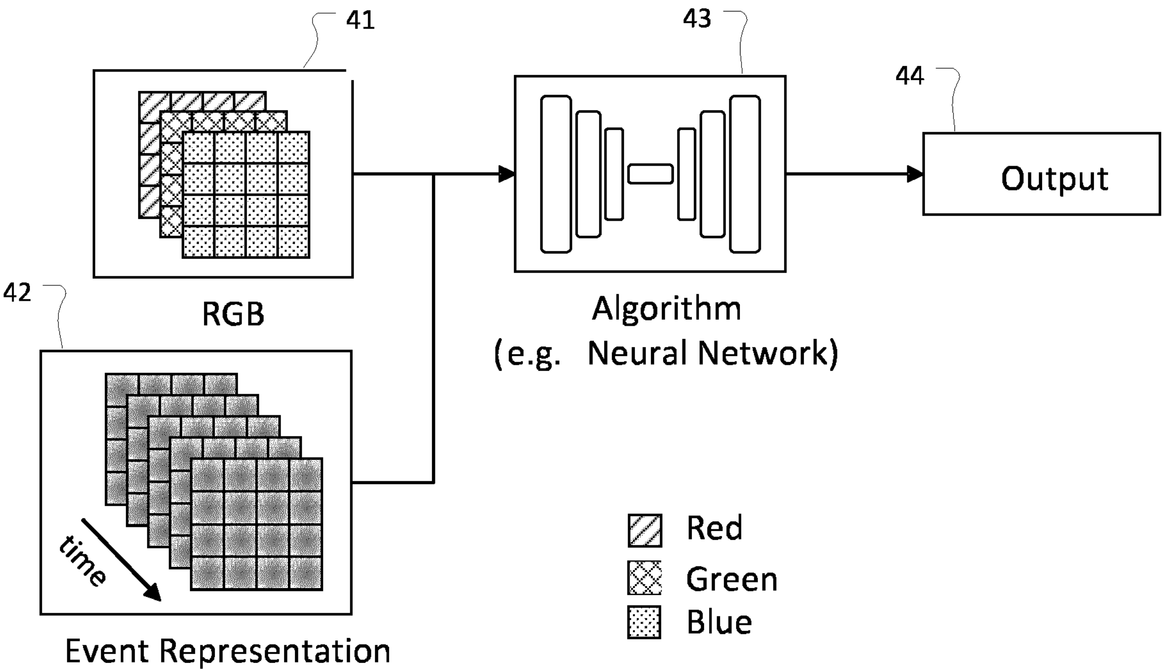
FIG. 4 schematically shows an example of processing data obtained from a hybrid sensor.

FIG. 4 schematically shows an example of processing data obtained from a multi-vision solution. Raw events obtained from an EVS sensor are accumulated and transformed into an event representation 42 (e.g. 2D/3D based). This event representation 42 may encompass several frames or channels. These channels 42 are stacked together with RGB data 41 (e.g. in the form of RGB channels) and used as input to an algorithm 43 (e.g. a neural network or any other algorithm that represents an application or solves a task). Algorithm 43 leverages RGB data 41 and event data 42 as input data. From this input to the neural network 43, the neural network 43 generates output 44.

In the example of FIG. 4, camera parameters or preprocessing steps of image signal processing (ISP) which affect the RGB image values are neither taken into account before passing the data to the algorithm (e.g. a neural network), nor inside the algorithm itself (e.g. the architecture of the network).

The understanding in how the multi-modal output of an RGB-EVS hybrid sensor can be handled and fed into a single neural network is not straightforward.

For example, event resolution might differ from the RGB resolution, thus the receptive fields of both modalities might vary.

Still further, event frequency of the EVS sensor is much higher than the typical framerate of an APS sensor, and the data is being read in asynchronous fashion.

Other aspects relate to the ISP pipeline robustness: ISP pipelines have many processes which dynamically change the relationship between RGB frames and event output (e.g. white balance, tone reproduction, analog gain, etc.). An algorithm (e.g. neural network) trained for a certain set of camera parameters on RGB data might not be robust against changes thereof.

Still other aspects relate to dynamic range stability: RGB and events have different dynamic ranges. Thus, images might saturate in adverse lighting conditions and information is lost, while events are mostly unaffected by this. Downstream algorithms may not know about image saturation.

The embodiments described below in more detail increase the robustness of the algorithm (e.g. neural network) in handling certain tasks and thus improve its performance.

System Architecture with Metadata in the ISP Pipeline

The embodiments described below in more detail relate to systems that are comprised of multiple cameras (e.g. RGB, EVS multi-camera setup or RGB-EVS hybrid sensor), where the downstream algorithm is optimized to a certain image-event output relationship.

The embodiments described below in more detail for example provide a method for providing sensor data to algorithms (e.g. neural networks), the sensor data comprising data from an RGB-Event hybrid sensor. The methods may also comprise an EVS data pipeline.

In particular, the embodiments provide a camera system that produces metadata, in addition to images and event data. This metadata may be used as input to the downstream pipeline (e.g. pre-processing, post-processing, algorithms) to counteract changes in the image-event data stream relationship.

Figure 5:
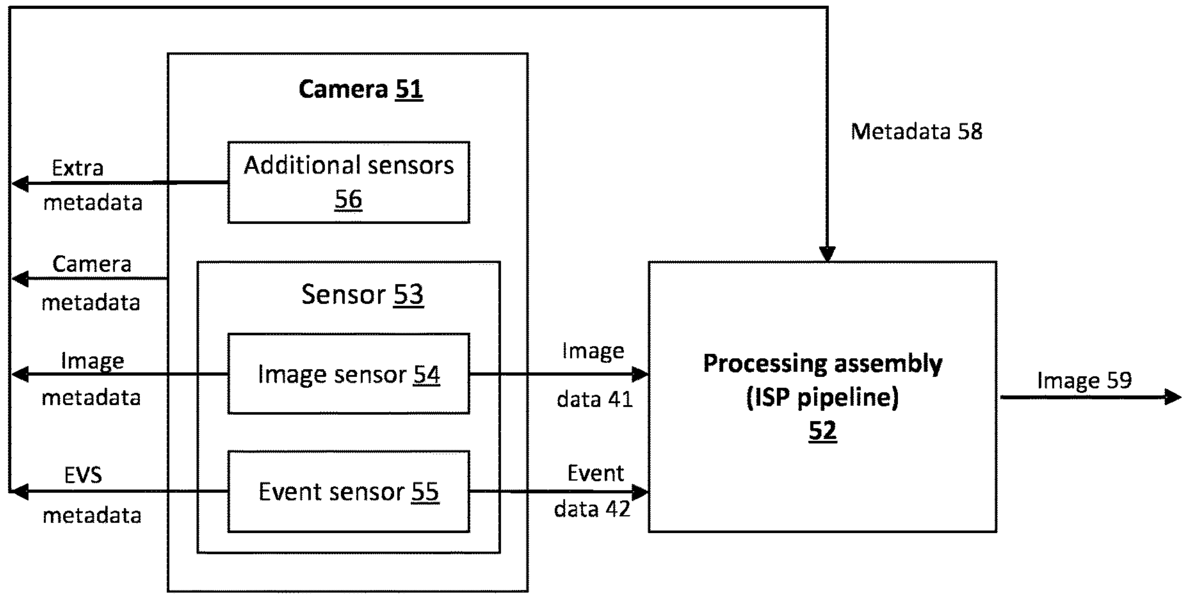
FIG. 5 shows an exemplifying schematic system architecture comprising a camera with hybrid sensor and a processing assembly that is configured to process data obtained from the camera.

FIG. 5 shows an exemplifying schematic system architecture comprising a camera with hybrid sensor and a processing assembly that is configured to process data obtained from the camera. A camera 51 comprises a hybrid sensor 53 comprised of an image sensor 54 of the APS-type, an event-based sensor 55 (of the EVS type), and additional sensors 56 (e.g. an Inertial Measurement Unit, IMU, or the like). A downstream algorithm is operated by a processing assembly 52 (implementing an ISP pipeline) to generate an output, e.g. an image 59. The processing assembly 52 receives image data 41 from image sensor 54 of camera 51, and event data 42 from event sensor 55 of camera 51. Still further, the processing assembly 52 receives metadata 58. This metadata 58 comprises image metadata obtained from image sensor 54, EVS metadata obtained from EVS sensor 55, camera metadata obtained from camera 51, and extra metadata obtained from the additional sensors 56.

The system architecture of FIG. 5 may thus improve data handling from different sensor modalities and resolution. In particular it may allow to improve any tasks to be solved downstream from the RGB-EVS hybrid sensor data stream.

In particular, metadata 58 can help to stabilize the relationship between images and events for changing environments, or help the algorithm to be at least aware of the changes and provide some regularization parameter to improve the algorithm itself. This may for example be helpful when the ISP pipeline implemented in the processing assembly changes depending on the scene being captured, while the events data stream is constant.

In this way, an algorithm operated by a processing assembly 52 and which is optimized for a certain set of relationship gets more robust against changes.

For example, the system architecture of FIG. 5 may result in performance improvement for certain tasks, e.g. deblurring, which takes in different RGB and event resolution.

Further, the system architecture of FIG. 5 may increase robustness of the ISP pipeline, or may provide added flexibility in handling multi-modal sensory data streams. Still further, current tasks can be solved with lower latency and lower computational effort.

As shown in FIG. 5 the additional metadata 58 can encompass different aspects and can have multiple sources. For example, the metadata may be obtained directly from the image sensor itself, and/or from the EVS, and/or from an additional sensor such as an Inertial Measurement Unit (IMU) of the camera, or the like.

The metadata 58 can take various forms, such as (but not limited to): APS pixel saturation, white balance value, tone reproduction gain, gamma gain, APS pixel noise sigma, APS pixel gain, APS exposure timestamps (possibly frame-wise, row-wise or pixel-wise), EVS contrast threshold value, EVS pixel location, IMU data, camera calibration, sensor temperature, etc.

Also, the metadata 58 can be passed or applied to in different locations: potential pre-processing of the camera data, the actual algorithm, potential post-processing after the algorithm.

Any end-user e.g. using a smartphone may for example profit from high performance in solving specific tasks that leverages event data (for example image deblurring). Still further, manufacturing and process control mechanism can be greatly improved while lowering energy and computational effort in conducting certain tasks (such as QR code reading).

In FIG. 5, camera 51 comprises a hybrid sensor for generating the image data 41 and the event data 42. It should however be noted that the embodiments may be applied both to sensors that include image and event sensors in the same module (hybrid sensors), or to multi-camera systems that comprise separate sensors of different type, such as an image sensor (APS-type) on the one hand, and an EVS sensor on the other hand.

Still further it should be noted that the additional sensors 56 in FIG. 5 are optional. Additional sensors may or may not be present in the camera, depending on what the metadata source is.

Still further it should be noted that the processing assembly 52 in FIG. 5 is not restricted to a specific architecture. It may, for example, consist of multiple pieces of hardware.

Use of Event Pixel Location as Metadata

Figure 6:
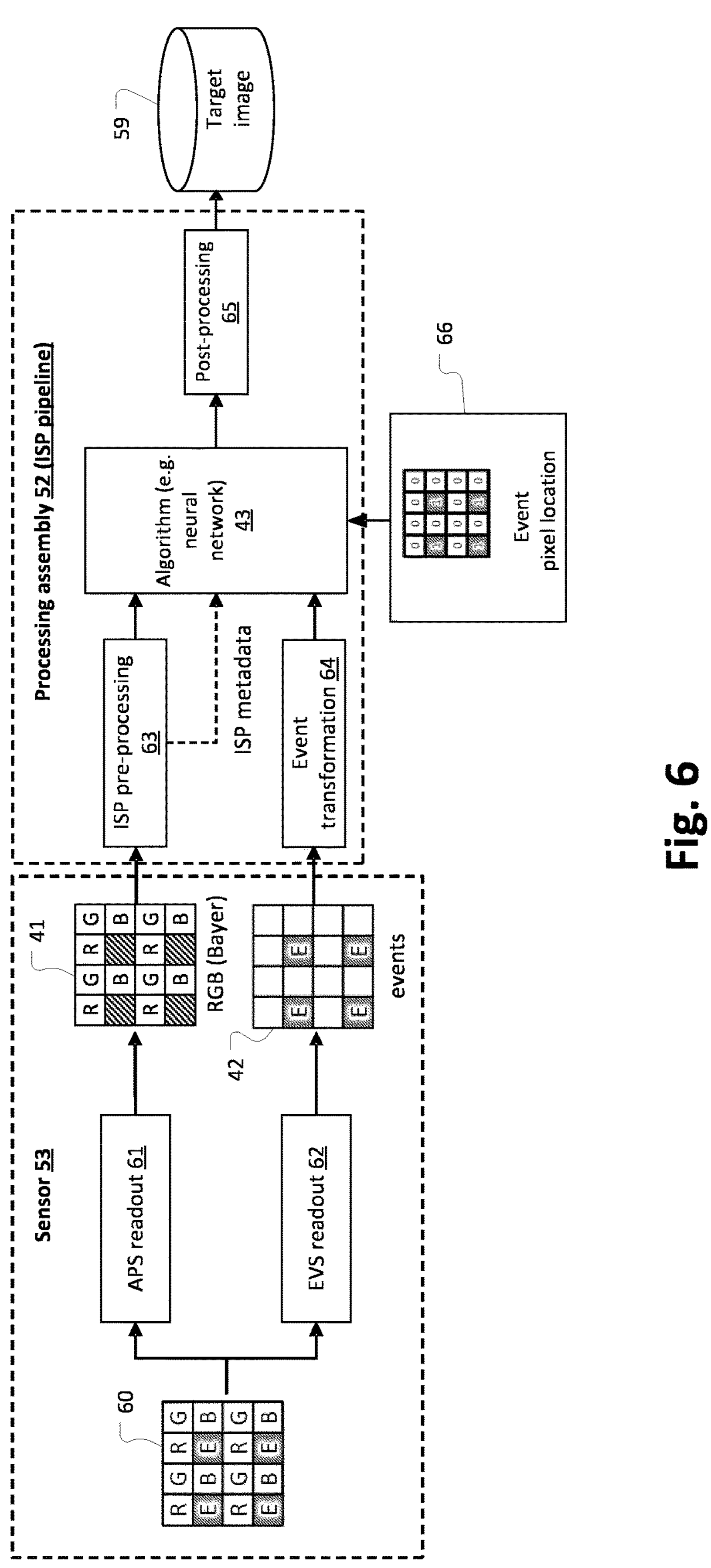
FIG. 6 shows an exemplifying schematic use of a processing assembly using metadata obtained from a hybrid sensor, the metadata comprising information on event pixel location.

FIG. 6 shows an exemplifying schematic use of a processing assembly using metadata obtained from a hybrid sensor, the metadata comprising information on event pixel location. A hybrid sensor 53 comprises pixels arranged according to the RGB-Event hybrid sensor layout 60 as described with regard to FIG. 3 above ("Layout 1"). The layout comprises a matrix of 4×4 pixels and the layout is generated by repeating a sub-pattern of 2×2 pixels twice in the vertical direction and in the horizontal direction, each sub-pattern of 2×2 pixels comprising three APS pixels R, G, B and one EVS pixel E.

An APS read out section 61 is configured to read out RGB data 41 obtained by hybrid sensor 53. The RGB data 41 is structured according to an RGB matrix (Bayer matrix) in which a first row and a third row comprises pixels according to the pattern R, G, R, G, and in which a second row and a fourth row comprises pixels that alternate according to the pattern nd., B, nd., B, where R denotes APS pixels of red color, G denotes APS pixels of green color, B denotes APS pixels of blue color, and nd. indicates that no RGB information is defined for the respective pixel.

An EVS read out section 62 is configured to read out the EVS data 42 obtained by hybrid sensor 53 as a stream of events.

A processing assembly 52 is arranged downstream of hybrid sensor 53 to operate an algorithm 43 (e.g. a neural network). An ISP pre-processing 63 performed in the processing assembly 52 receives the RGB data 41 from hybrid sensor 53. ISP pre-processing 63 pre-processes the RGB data 41 and passes pre-processed RGB data, as well as ISP metadata to algorithm 43. ISP pre-processing 63 may for example comprise processing such as demosaicing. Preprocessing steps, such a demosaicing, processes the raw data obtained from single RGB pixels in order to generate an RGB image. Still further, an event transformation 64 performed in the processing assembly 52 receives the EVS data 42 from hybrid sensor 53. Event transformation 64 performs an event transformation on the EVS data 42 and passes transformed EVS data to algorithm 43. One possible representation of the asynchronous and continuous stream of event data is to transform it into a 2D frame using the pixel location of each event and its timestamp as the value of the pixel. Another option is to transform incoming events in a certain time window or a fixed number of events into a 3D volume. The x- and y-dimension represent the location of the event, while the 3$^{rd}$ axis represents the arrival time of the event. This discretized 3D volume is also called a voxel grid or event grid. This representation transformation is adapted to the required input shape of the downstream algorithm or neural network architecture. It should however be noted that transforming the event data is optional. For example, it may not be needed if for e.g. a Spiking Neural Network is used. Further details concerning this transformation of the event stream are described with regard to FIGS. 7*a*-*d* below. Still further, algorithm 43 receives information 66 on event pixel location. The algorithm 43 operated by processing assembly 52 generates a target image 59 (e.g. the algorithm targets at outputting a sharp image from a blurry input image, etc.) based on the transformed EVS data obtained from event transformation 64, based on the pre-processed RGB data obtained from ISP pre-processing 63, and based on the information 66 on event pixel location. A post-processing 65 is applied to the output image provided by the algorithm in order to generate the target image 59. Post-processing may include, but is not limited to, noise reduction, gamma correction, or the like. It should however be noted that post-processing is optional. Still further, algorithm 43 must not necessarily be at the end of the ISP pipeline 52, but it can be middle stage of the ISP.

Instead of interpolating events, in the example of FIG. 6, the event frame obtained from event transformation 64 is fed to algorithm 43 as it is, and the locations of event pixels within the pixel layout are provided to the algorithm 43 as additional metadata input. That is, even though event representations (also called "event pixels") obtained from event transformation 64 are typically not the same type of information as the pixels of the final output image 59, no interpolating of event pixels to the domain of the target image 59 is necessary. The interpolating of event pixels into the domain of the target image 59, which is additional work and incurs a computational cost, can thus be avoided.

Information 66 on event pixel location may for example be a structure derived from a pixel layout, such as from layout 60 in FIG. 6 (or from the other layouts which are exemplarily provided in FIG. 3). The pixel layout of a sensor, or of a mode of the sensor, is intrinsic to the sensor itself, and thus constitutes pre-known information. Based on a predefined structure derived from the pixel layout, event pixel information (e.g. pixel coordinates in the event domain) can be translated to the domain of a target image 59 (e.g. pixel coordinates in the domain of the target image). For example, layout 60 comprises a matrix of 4×4 pixels and the layout is generated by repeating a sub-pattern of 2×2 pixels twice in the vertical direction and in the horizontal direction, each sub-pattern of 2×2 pixels comprising three APS pixels R, G, B and one EVS pixel E. As shown in FIG. 6, the information 66 on event pixel location for this layout 60 may for example be expressed as a matrix with 0-entries at the position of an APS pixel and 1-entries at the position of an EVS pixel. Event pixel location 66 for layout 60 may thus be expressed as a matrix comprising four rows and four columns, the first row and the third row comprising the values 0, 0, 0, 0, and the second row and the fourth row comprising the values 1, 0, 1, 0. Similar structures defining the location of the EVS pixels can be defined for other sensor layouts, such as e.g. "Layout 2" and "Layout 3" of FIG. 3. Algorithm 43 can use this structure to translate event pixel information into the pixel domain of the target image 59 (either algorithmically or, intrinsically as a result of training of a neural network that uses the pixel location information as an input during training).

In the example of FIG. 6, the event pixel location 66 is described as matrix derived from a pixel layout. It should however be noted that event pixel location 66 might alternatively be provided in the form of a translation table that directly translates pixel coordinates from the event domain to pixel coordinates in the domain of the target image 59.

If a hybrid sensor provides different modes of operation as described in FIG. 1 above, then pixel location information 66 may be defined in the form of a structure for each of the modes of the sensor individually. The pixel location information 66 input to algorithm 43 will then change with every change of the operating mode of the sensor.

FIGS. 7*a-d* show examples of an event representation transformation as it may be performed at event transformation 64 of FIG. 6. To handle the sparse and continuous event data stream obtained from the EVS sensor the sensor raw data is transformed. One possibility is to use a dedicated representation called voxel grids (or event grids) which represent events in a fixed grid that can be input into standard networks. Voxel grids are 3D volumes, where events are split to a specific layer/channel according to their timestamp. Voxel grids (event grids) may be created with a combination of the following methods. A predefined number or fixed time windows of events are defined, and, based on these time windows, time is split into channels (time bins). Then, event pixel values are interpolated according to exact arrival timestamp between two channels. Optionally or alternatively, there is the possibility to split event values along a polarity dimension.

Figure 7A:
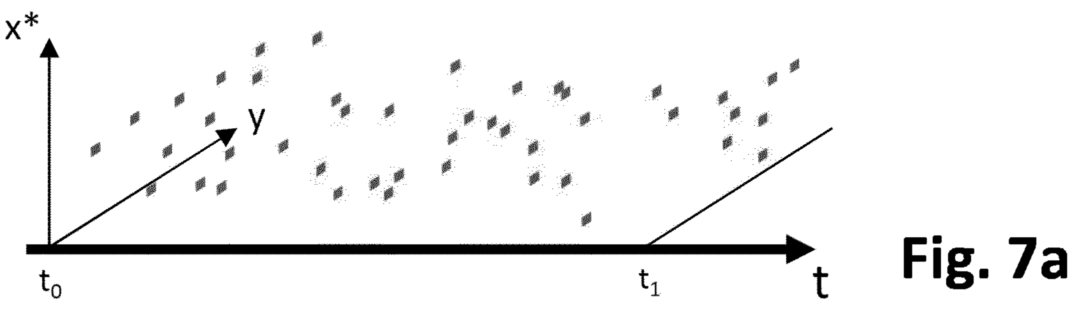
FIGS. 7*a-d* show examples of an event representation transformation.

FIG. 7*a* schematically shows a data stream as obtained from an EVS sensor. Multiple individual events captured between times to and ti by the sensor are plotted in a three-dimensional diagram. The abscissa of the three-dimensional diagram shows the time at which an event was captured. The ordinate x* and the depth-axis y show the pixel position at which the event was captured.

Figure 7B:
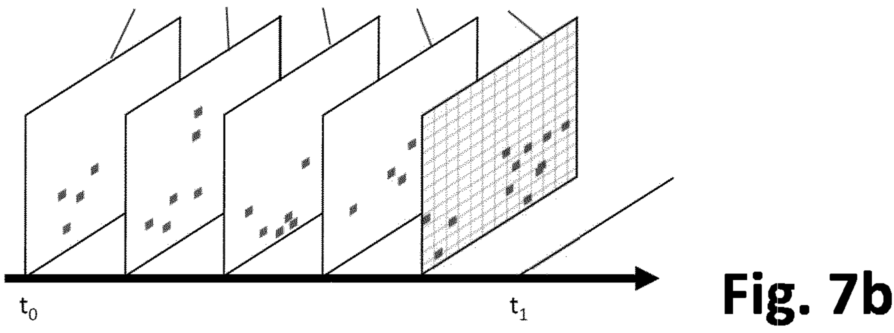

FIG. 7*b* shows an example of accumulating events obtained from an EVS sensor in channels. A predefined number or fixed time windows of events is defined. Time is thus split into a predefined number of channels (time bins), here for example 5 channels.

Figure 7C:
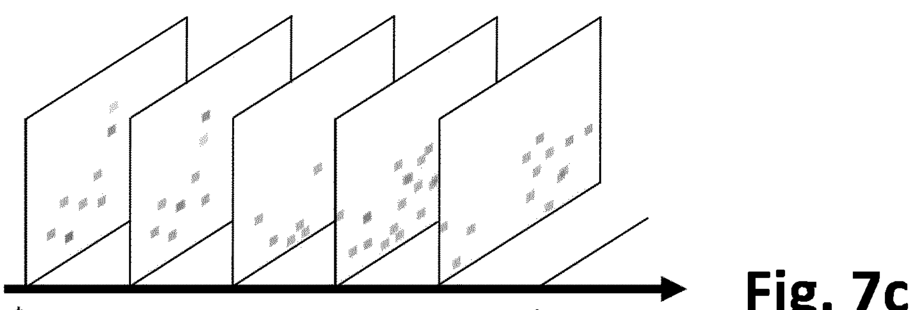

FIG. 7*c* shows an example of time bin interpolation of events obtained from an EVS sensor. Event pixel values are interpolated according to their exact arrival timestamp between two channels.

Figure 7D:
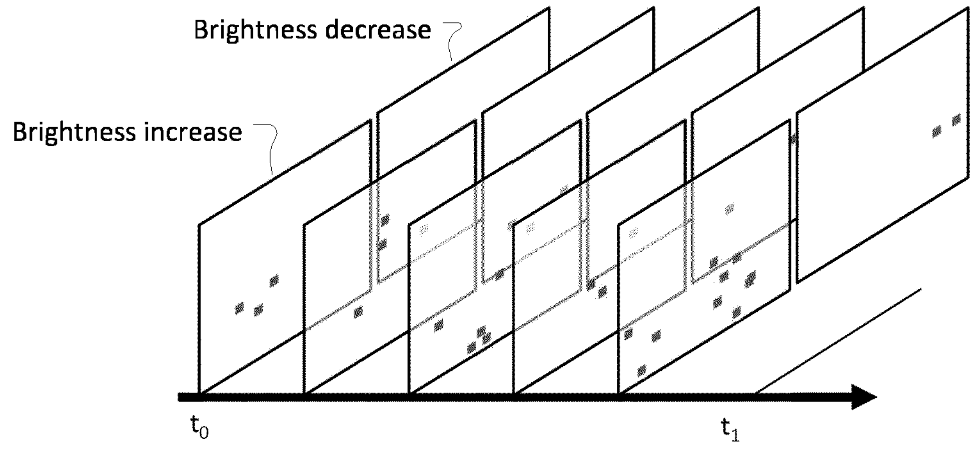

FIG. 7*d* shows an example of splitting events obtained from an EVS sensor along a polarity dimension. The events obtained from the sensors event stream have different polarities. This polarity may for example be expressed as a 1-bit polarity p of the brightness change decoding brightness increase, or brightness decrease. In the example of FIG. 7*d* all events with positive polarity (brightness increase) are grouped together, and all events with negative polarity (brightness decrease) are grouped together.

Use of a Saturated Area Mask as Metadata

Another example of camera metadata is to make a saturated area mask from RGB data and to provide this saturated area mask as metadata to a downstream algorithm.

Figure 8:
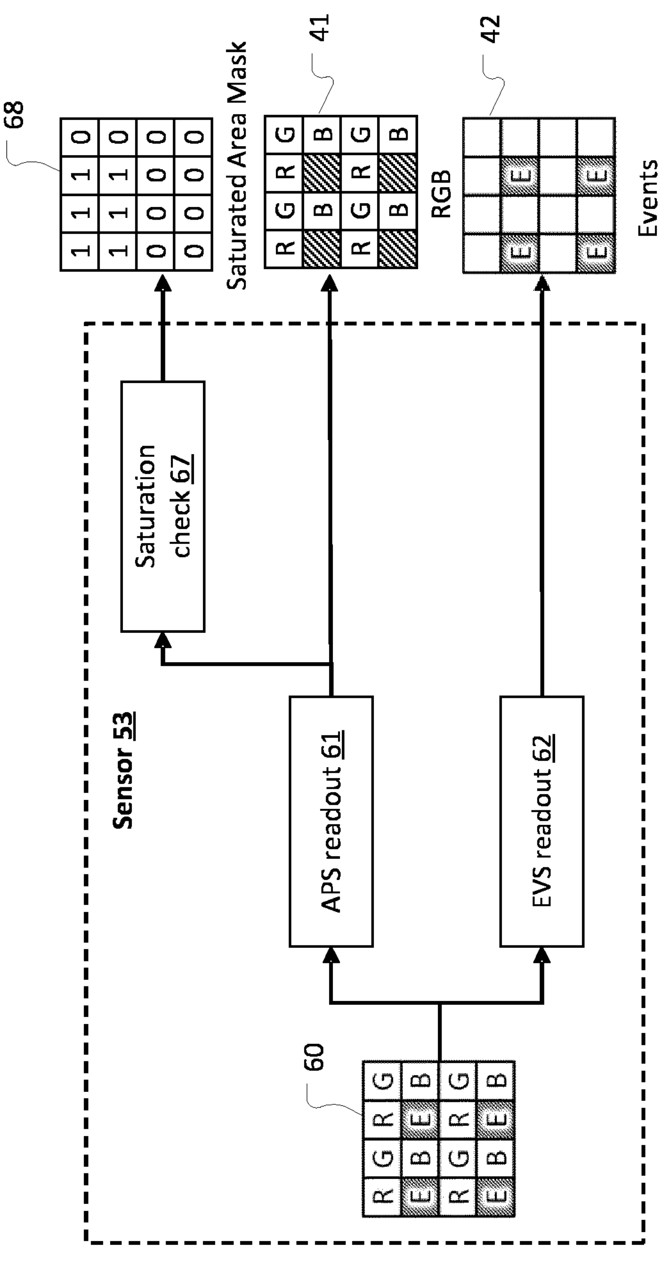
FIG. 8 shows an embodiment of a saturated area mask generation implemented inside of a sensor circuit, such that the sensor directly outputs the saturated area mask.

FIG. 8 shows an embodiment of a saturated area mask generation implemented inside of a sensor circuit, such that the sensor directly outputs the saturated area mask. A hybrid sensor 53 comprises pixels arranged according to the RGB-Event hybrid sensor layout 60 as described with regard to FIG. 3 above ("Layout 1"). The layout comprises a matrix of 4×4 pixels and the layout is generated by repeating a sub-pattern of 2×2 pixels twice in the vertical direction and in the horizontal direction, each sub-pattern of 2×2 pixels comprising three APS pixels R, G, B and one EVS pixel E.

As in the example of FIG. 6 above, an APS read out section 61 is configured to read out RGB data 41 obtained by hybrid sensor 53. RGB data 41 is structured according to an RGB matrix (Bayer matrix) in which a first row of and a third row comprises pixels according to the pattern R, G, R, G, and in which a second row and a fourth row comprises pixels that alternate according to the pattern nd., B, nd., B, where R denotes APS pixels of red color, G denotes APS pixels of green color, B denotes APS pixels of blue color, and nd. indicates that no RGB information is defined for the respective pixel. Further, as in the example of FIG. 6 above, An EVS read out section 62 is configured to read out EVS data 42 obtained by hybrid sensor 53 as a stream of events.

A saturation check 67 is arranged within the hybrid sensor 53. The saturation check 53 is configured to generate a saturated area mask 68 from the RGB data 41 obtained by sensor 53. The saturated area mask 68 indicates where the APS pixels are saturated. If an APS pixel or its surrounding pixels are saturated, the corresponding area in the mask indicates this with a flag. Saturation is determined by whether the pixel value is above a certain threshold. In the exemplifying saturated area mask 68 of FIG. 8, a 1-value of the flag indicates saturation, whereas a 0-value of the flag indicates no saturation. This means that the exemplifying saturated area mask 68 of FIG. 8 indicates that a block of 3×2 pixels in the upper-left corner of the pixel matrix comprises pixels which are all saturated.

As in the example of FIG. 5 above, saturated area mask 68 may be transmitted as metadata (58 in FIG. 5) for further processing to a downstream algorithm (not shown in FIG. 8), together with the RGB data 41 and the event data 42. This may make the algorithm more robust, as it can avoid the situation that, when an RGB pixel is saturated, the intensity ratio between the information in the event frame and the RGB pixel is not constant. Keeping the intensity ratio between event frame and RGB pixel constant, however, makes it easier for the downstream algorithm to perform its task efficiently, as it does not have to handle dynamic range differences between RGB and events.

In the example of FIG. 8, the saturated area mask is generated inside of a sensor circuit. In alternative embodiments, the saturated area mask generation can also be implemented in the middle or at the end of ISP block, or implemented in FPGA or as a software process.

Figure 9:
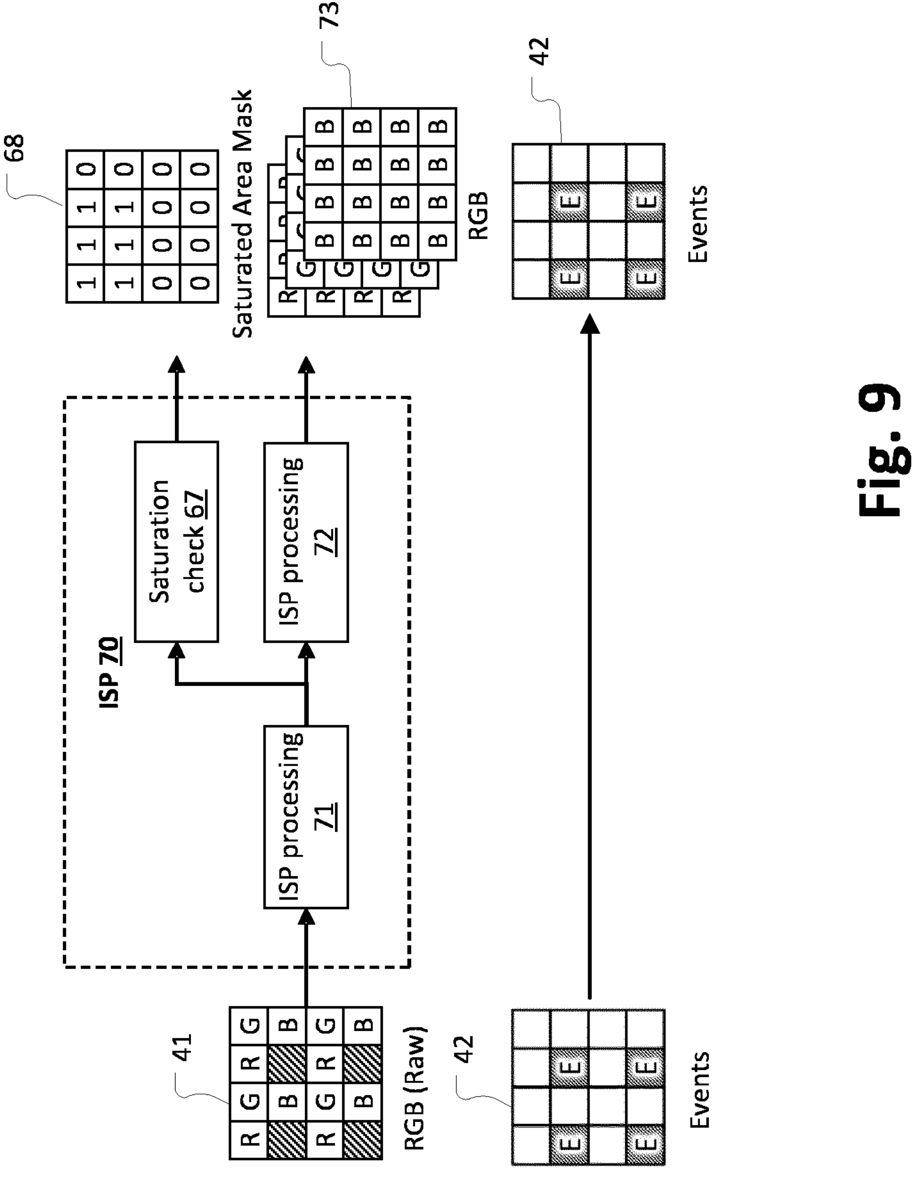
FIG. 9 shows an embodiment of a saturated area mask generation implemented inside the image signal processing (ISP)

FIG. 9 shows an embodiment of a saturated area mask generation implemented inside the ISP. A hybrid sensor (not shown in FIG. 9) comprises pixels arranged according to the RGB-Event hybrid sensor layout 60 as described with regard to FIG. 3 above ("Layout 1"). As in the example of FIG. 6 above, an APS read out section (not shown in FIG. 9) is configured to read out RGB data 41 obtained by the hybrid sensor. RGB data 41 is structured according to an RGB matrix (Bayer matrix). Further, as in the example of FIG. 6 above, an EVS read out section (not shown in FIG. 9) is configured to read out EVS data 42 obtained by the hybrid sensor as a stream of events. A first ISP process 71 of an ISP 70 processes the RGB data 41 and provides it to a saturation check 67 arranged within ISP 70. Saturation check 67 is configured to generate a saturated area mask 68 from the RGB data 41 obtained by the sensor. Saturated area mask 68 indicates where the APS pixels are saturated. If an APS pixel or its surrounding pixels are saturated, the corresponding area in the mask indicates this with a flag. Saturation is determined by whether the pixel value is above a certain threshold. In the exemplifying saturated area mask 68 of FIG. 9, a 1-value of the flag indicates saturation, whereas a 0-value of the flag indicates no saturation. This means that the exemplifying saturated area mask 68 of FIG. 9 indicates that a block of 3×2 pixels in the upper-left corner of the pixel matrix comprises pixels which are all saturated. A second ISP process 72 of ISP 70 processes the output of ISP process 71 in order to separate the RGB data 41 into different color layers 73.

Figure 10:
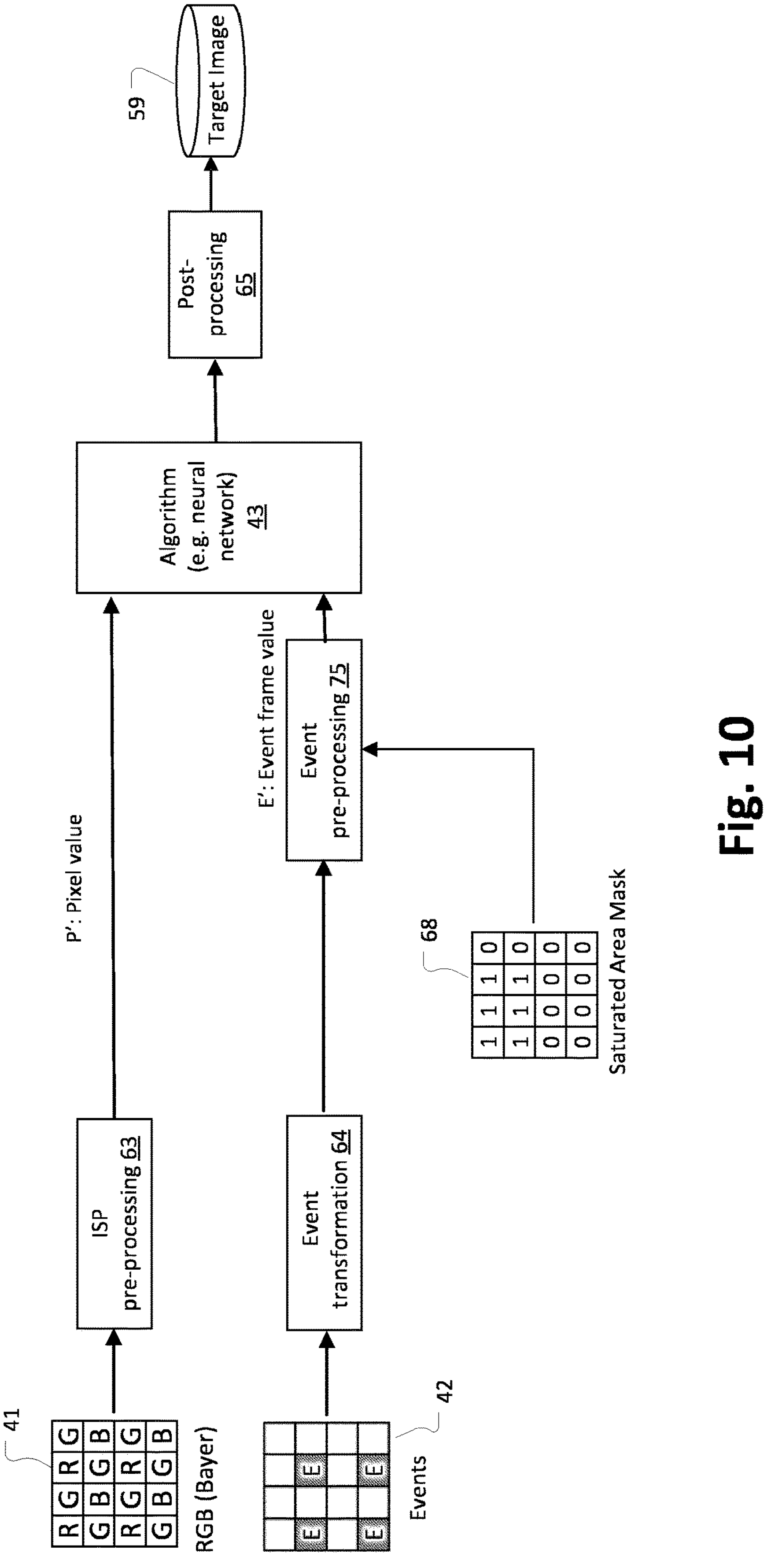
FIG. 10 schematically shows an image signal processing pipeline where a saturated area mask is used in an event pre-processing stage.

As will be shown below in more detail, the saturated area mask obtained according to the processes described with regard to FIGS. 8 and 9 above can be used in different locations of an ISP. FIG. 10 schematically shows an image signal processing pipeline where a saturated area mask is used in an event pre-processing stage. An ISP pipeline is arranged downstream of a hybrid sensor to operate an algorithm 43 (e.g. a neural network). An ISP pre-processing 63 receives RGB data 41 from a hybrid sensor. ISP pre-processing 63 pre-processes the RGB data 41 and passes a pre-processed image (pixels P') to algorithm 43. Still further, an event transformation 64 receives EVS data 42 from the hybrid sensor. Event transformation 64 performs an event transformation on the EVS data 42 and passes transformed EVS data to an event pre-processing 75. Event pre-processing 75 processes the transformed EVS data received from event transformation 64 based on a saturated area mask 68 to generate pre-processed event data (event frame value E'). Event pre-processing 75 may for example delete those events where the corresponding RGB pixel is saturated. As a result of this process, there are no events in the saturated area, thus it may avoid events in the saturated APS area to change the output image. The saturated area mask 68 may for example be obtained according to the processes described with regard to FIGS. 8 and 9 above. Algorithm 43 generates a target image 59 based on the pre-processed EVS data (event frame value E') obtained from event pre-processing 75, based on the pre-processed RGB data (pixels P') obtained from ISP pre-processing 63. A post-processing 65 is applied to the output of the algorithm 43 in order to generate the target image 59.

Figure 11:
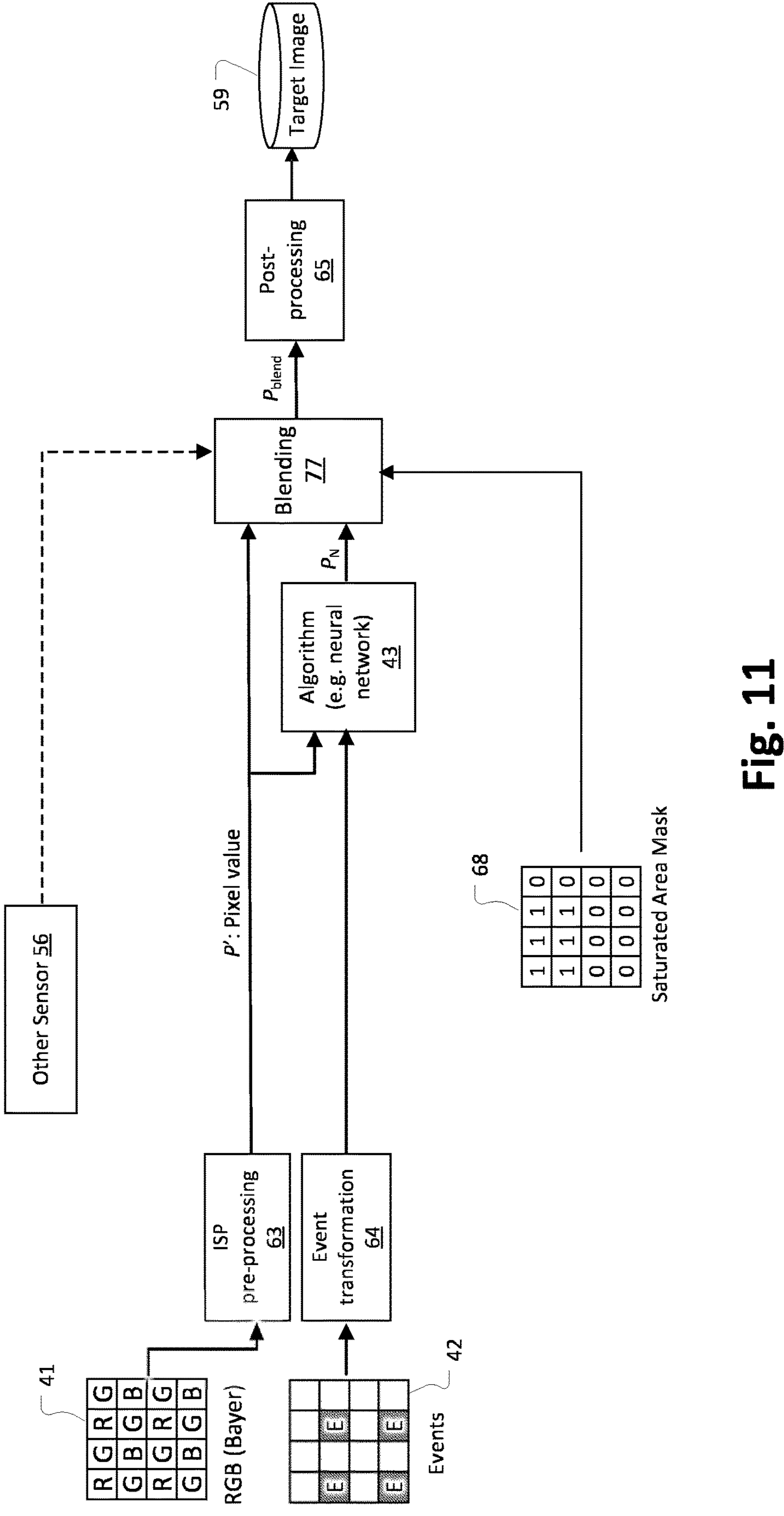
FIG. 11 schematically shows an image signal processing pipeline where a saturated area mask is used in a blending stage to bypass the input image.

FIG. 11 schematically shows an image signal processing pipeline where a saturated area mask is used in a blending stage. Using additional metadata 68 provided to the blending stage, it decides whether to just output the input image from 63 or the processed image from the algorithm 43, as the processed image might have artifacts due to pixel saturation. An ISP pipeline is arranged downstream of a hybrid sensor to operate an algorithm 43 (e.g. a neural network). An ISP pre-processing 63 receives RGB data 41 from the hybrid sensor. ISP pre-processing 63 pre-processes the RGB image 41 (pixels P') and passes pre-processed RGB image to algorithm 43. Still further, an event transformation 64 receives EVS data 42 from the hybrid sensor. Event transformation 64 performs an event transformation on the EVS data 42 and passes transformed EVS data to algorithm 43. Algorithm 43 generates an algorithm output $P_N$ based on the transformed EVS data obtained from event transformation 64 and based on the pre-processed RGB data obtained from ISP pre-processing 63. The image (pixels $P_N$) output by the algorithm 43 is provided to blending 77. Based on a saturated area mask 68 used as metadata (see image metadata 58 in FIG. 5), blending 77 blends the pre-processed RGB data obtained from ISP pre-processing 63 with the output $P_N$ of algorithm 43 to generate a blended image (pixels $P_{blend}$). The saturated area mask 68 may for example have been obtained according to the processes described with regard to FIGS. 8 and 9 above. As indicated by the dashed arrow, blending 77 might optionally also consider additional metadata from another sensor 56 when generating the blended image $P_{blend}$. A post-processing 65 is applied to the output of blending 77 in order to generate the target image 59.

In blending 77, the blended image may for example be calculated according to $$P_{blend} = \alpha P_N + (1 - \alpha) P'$$

where P' is a pixel value output by the ISP pre-processing 63 and $P_N$ is a corresponding pixel value output by algorithm 43, and $P_{blend}$ is a pixel of the blended image.

The blend rate α can for example be calculated based on the saturated area mask, such that in saturated areas the output from the algorithm is disabled. Alternatively, the blend rate α can be calculated based on dark areas of the input image. Yet alternatively, the blend rate α can be calculated based on data from other sensors, such as IMU. For example, when an IMU mounted on the camera detects no motion, α may be set to have a lower value.

Figure 12:
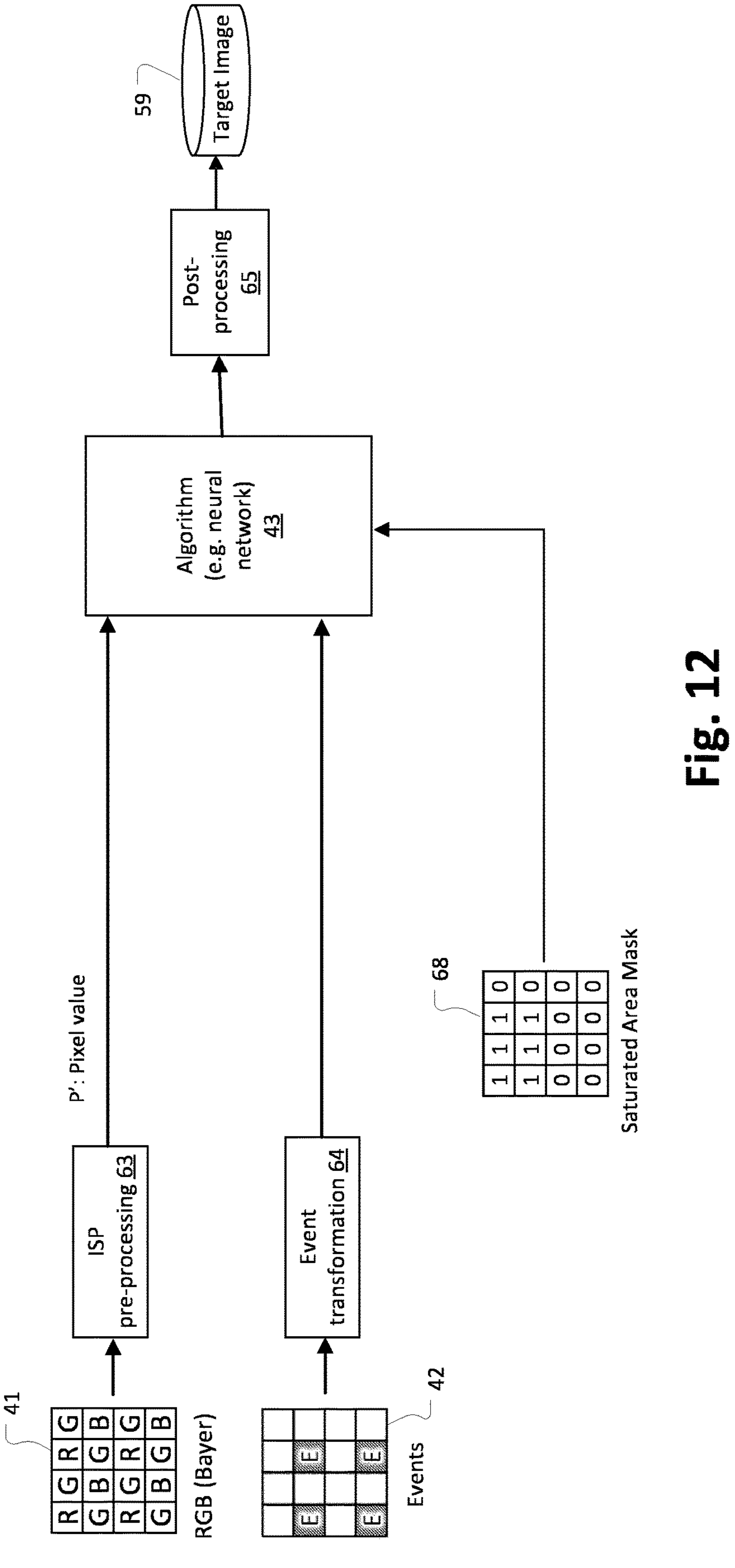
FIG. 12 schematically shows an image signal processing pipeline where a saturated area mask is used directly as one of the inputs to an algorithm.

FIG. 12 schematically shows an image signal processing pipeline where a saturated area mask is used directly as one of the inputs to an algorithm. As a result, the algorithm itself will make use of the information about saturated areas. For example, a neural network may learn how to handle saturated areas. As in the examples of FIGS. 10 and 11, an ISP pipeline is arranged downstream of a hybrid sensor to operate an algorithm 43 (e.g. a neural network). An ISP pre-processing 63 receives RGB data 41 from the hybrid sensor. ISP pre-processing 63 pre-processes the RGB data 41 and passes pre-processed RGB data to algorithm 43. Still further, an event transformation 64 receives EVS data 42 from the hybrid sensor. Event transformation 64 performs an event transformation on the EVS data 42 and passes transformed EVS data to algorithm 43. Algorithm 43 generates an algorithm output based on the transformed EVS data obtained from event transformation 64 and based on the pre-processed RGB data obtained from ISP pre-processing 63, and based on a saturated area mask 68 used as metadata (see image metadata 58 in FIG. 5). The saturated area mask 68 may for example have been obtained according to the processes described with regard to FIGS. 8 and 9 above. A post-processing 65 is applied to the output of algorithm 42 in order to generate the target image 59.

In the embodiments of FIGS. 8 to 12, information about pixel saturation is used as metadata in order to increase the robustness of the ISP pipeline. Information about pixel saturation is, however, only used as an example. Other camera parameters can also be passed as metadata to the algorithm in a fitting representation (such as a frame). Other examples of metadata are for example parameters such as: white balance value, tone reproduction gain, gamma gain, APS pixel noise sigma, APS pixel gain, APS exposure timestamps (possibly frame-wise, row-wise or pixel-wise), EVS contrast threshold value, IMU data, camera calibration, sensor temperature, or an intermediate image from inside the ISP block (for example before an ISP step that applies a scene-dependent value, like before white balance).

Figure 13:
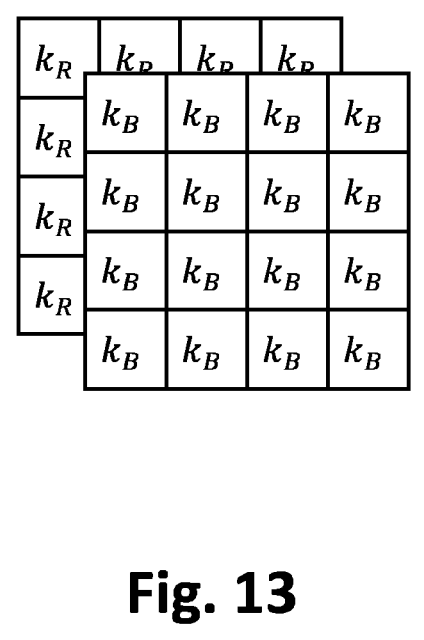

FIG. 13 shows an example of metadata which comprises white balance values for the pixels of a frame. A white balance value of an RGB pixel is expressed as $[K_R, 1, K_B]$, where $K_R$ is a gain parameter for the red channel, and kg is a gain parameter for the blue channel. According to the example of FIG. 13, the green channel is maintained without gain change, i.e. its gain factor is chosen to be 1. The white balance values $[K_R, 1, K_B]$ of the pixels of RGB data may for example be obtained directly within a sensor (similar to 67 in FIG. 8), or in an ISP processing stage downstream of a sensor (similar to 67 in FIG. 9) by any white balancing techniques known to the skilled person.

It should be noted that the description above is only an example configuration. Alternative configurations may be implemented with additional or other units, sensors, or the like.

It should also be noted that the division of the systems into units is only made for illustration purposes and that the present disclosure is not limited to any specific division of functions in specific units.

It should also be recognized that the embodiments describe methods with an exemplary ordering of method steps. The specific ordering of method steps is, however, given for illustrative purposes only and should not be construed as binding.

All units and entities described in this specification and claimed in the appended claims can, if not stated otherwise, be implemented as integrated circuit logic, for example, on a chip, in FPGA, or the like, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

[1] A system comprising circuitry configured to perform an image processing task, the circuitry comprising a multi-vision solution configured to provide APS data (41) and EVS data (42), and the circuitry being configured to generate metadata (58, 66, 68) and to provide the metadata (58, 66, 68) to an image processing pipeline (52, 70) comprising an algorithm (43) configured to perform the image processing task.

[2] The system of [1], wherein the image processing pipeline (52, 70) is configured to use the metadata (58, 66, 68) to counteract changes in an image-event data stream relationship.

[3] The system of [1] or [2], wherein the algorithm (43) is optimized to a certain image-event output relationship.

[4] The system of any one of [1] to [3], wherein the metadata (58, 66, 68) comprises APS metadata obtained from the multi-vision solution (53), EVS metadata obtained from the multi-vision solution (53), camera metadata, and/or extra metadata from additional sensors (56).

[5] The system of any one of [1] to [4], wherein circuitry is configured to provide the metadata (58, 66, 68) to a pre-processing (75) of the image processing pipeline (52, 70).

[6] The system of any one of [1] to [5], wherein the image processing pipeline (52, 70) comprises an event pre-processing (75), and wherein the event pre-processing (75) is configured to use the metadata (58, 66, 68) to pre-process the EVS data (42) or to pre-process data derived from the EVS data (42).

[7] The system of any one of [1] to [6], wherein circuitry is configured to provide the metadata (58, 66, 68) to a post-processing (77, 65) of the image processing pipeline (52, 70).

[8] The system of any one of [1] to [7], wherein circuitry is configured to provide the metadata (58, 66, 68) to a blending (77), the blending being configured to blend APS data (41) or data derived from the APS data (41) with EVS data (42) or data derived from the EVS data (41) based on the metadata (58, 66, 68).

[9] The system of any one of [1] to [8], wherein the circuitry is configured to provide the metadata (58, 66, 68) directly to the algorithm (43) of the image processing pipeline (52, 70).

[10] The system of any one of [1] to [9], wherein the metadata (58, 66, 68) comprises information (66) on event pixel location.

[11] The system of any one of [1] to [10], wherein the metadata (58, 66, 68) comprises a saturated area mask (68).

[12] The system of [11], wherein the hybrid sensor comprises circuitry configured to generate the saturated area mask (68).

[13] The system of [11], wherein the image processing pipeline (52, 70) is configured to generate the saturated area mask (68).

[14] The system of any one of [1] to [13], wherein the image processing pipeline (52) comprises an event transformation (64).

[15] The system of any one of [1] to [14], wherein performing the image processing task comprises generating a target image (59).

[16] The system of any one of [1] to [15], wherein performing the image processing task comprises generating a target image (59) and performing a post-processing (65).

[17] The system of any one of [1] to [16], wherein the metadata (58, 66, 68) comprises one or more of a white balance value, a tone reproduction gain, a gamma gain, an APS pixel noise sigma, an APS pixel gain, an APS exposure timestamps, an EVS contrast threshold value, IMU data, camera calibration data, sensor temperature, or an intermediate image from inside the image processing pipeline (52, 70).

[18] The system of any one of [1] to [17], wherein the multi-vision solution comprises an EVS sensor and an APS sensor.

[19] The system of any one of [1] to [18], wherein the multi-vision solution comprises a multi-camera system.

[20] A method for performing an image processing task, comprising obtaining APS data (41) and EVS data (42) from a multi-vision solution (53), generating metadata (58, 66, 68), and providing the metadata (58, 66, 68) to an image processing pipeline (52, 70) comprising an algorithm (43) configured to perform the image processing task.

[21] A program comprising instructions, the instructions being configured to, when operated by a processor, perform the method of [20].

REFERENCE SIGNS

11, 12 states of hybrid sensor
S1, S2 switch of operation mode
41 RGB data (image data)
42 event representation (event data)
43 algorithm (e.g. neural network)
44 algorithm output
51 camera
52 processing assembly
53 hybrid sensor
54 image sensor
55 event sensor
56 additional sensors
58 metadata
59 image (target image)
50 pixel layout
61 APS read out
62 EVS read out
63 ISP pre-processing
64 event transformation
65 post processing
66 event pixel location
67 saturation check
68 saturated area mask
70 image signal processing (ISP)
71, 72 ISP processes
73 RGB data (color layers)
75 event preprocessing
77 blending
81 APS camera
82 EVS camera
83 image data
84 event data

The invention claimed is:

1. A system comprising circuitry configured to perform an image processing task, the circuitry comprising a multi-vision solution configured to provide active pixel sensor (APS) data and event-based sensor (EVS) data, and the circuitry being configured to generate metadata and to provide the metadata to an image processing pipeline comprising an algorithm configured to perform the image processing task, wherein the metadata comprises information on event pixel location; wherein the metadata comprises a saturated area mask; and wherein the metadata comprises one or more of a white balance value, a tone reproduction gain, a gamma gain, an APS pixel noise sigma, an APS pixel gain, an APS exposure timestamps, an EVS contrast threshold value, IMU data, camera calibration data, sensor temperature, or an intermediate image from inside the image processing pipeline.

2. The system of claim 1, wherein the image processing pipeline is configured to use the metadata to counteract changes in an image-event data stream relationship.

3. The system of claim 1, wherein the algorithm is optimized to a certain image-event output relationship.

4. The system of claim 1, wherein the metadata comprises APS metadata obtained from the multi-vision solution, EVS metadata obtained from the multi-vision solution, camera metadata, and/or extra metadata from additional sensors.

5. The system of claim 1, wherein circuitry is configured to provide the metadata to a preprocessing of the image processing pipeline.

6. The system of claim 1, wherein the image processing pipeline comprises an event preprocessing, and wherein the event pre-processing is configured to use the metadata to pre-process the EVS data or to pre-process data derived from the EVS data.

7. The system of claim 1, wherein circuitry is configured to provide the metadata to a post-processing of the image processing pipeline.

8. The system of claim 1, wherein circuitry is configured to provide the metadata to a blending, the blending being configured to blend APS data or data derived from the APS data with EVS data or data derived from the EVS data based on the metadata.

9. The system of claim 1, wherein the circuitry is configured to provide the metadata directly to the algorithm of the image processing pipeline.

10. The system of claim 1, wherein the hybrid sensor comprises circuitry configured to generate the saturated area mask.

11. The system of claim 1, wherein the image processing pipeline is configured to generate the saturated area mask.

12. The system of claim 1, wherein the image processing pipeline comprises an event transformation.

13. The system of claim 1, wherein performing the image processing task comprises generating a target image.

14. The system of claim 1, wherein performing the image processing task comprises generating a target image and performing a post-processing.

15. The system of claim 1, wherein the multi-vision solution comprises a hybrid vision sensor comprising an EVS sensor and an APS sensor.

16. The system of claim 1, wherein the multi-vision solution comprises a multi-camera system.

17. A method for performing an image processing task, comprising obtaining active pixel sensor (APS) data and event-based sensor (EVS) data from a multi-vision solution, generating metadata, and providing the metadata to an image processing pipeline comprising an algorithm configured to perform the image processing task, wherein the metadata comprises information on event pixel location; wherein the metadata comprises a saturated area mask; and wherein the metadata comprises one or more of a white balance value, a tone reproduction gain, a gamma gain, an APS pixel noise sigma, an APS pixel gain, an APS exposure timestamps, an EVS contrast threshold value, IMU data, camera calibration data, sensor temperature, or an intermediate image from inside the image processing pipeline.

18. A non-transitory computer readable medium comprising a program comprising instructions, the instructions being configured to, when operated by a processor, perform the method of claim 17.

* * * * *